United States Patent
Wang et al.

(10) Patent No.: US 9,754,160 B2
(45) Date of Patent: Sep. 5, 2017

(54) METHOD AND DEVICE FOR DETECTING GATHERING OF OBJECTS BASED ON STEREO VISION AS WELL AS NON-TRANSITORY COMPUTER-READABLE MEDIUM

(71) Applicants: Qian Wang, Beijing (CN); Shengyin Fan, Beijing (CN); Xin Wang, Beijing (CN); Gang Qiao, Beijing (CN); Jiadan Zhu, Beijing (CN)

(72) Inventors: Qian Wang, Beijing (CN); Shengyin Fan, Beijing (CN); Xin Wang, Beijing (CN); Gang Qiao, Beijing (CN); Jiadan Zhu, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/151,940

(22) Filed: May 11, 2016

(65) Prior Publication Data
US 2016/0335491 A1 Nov. 17, 2016

(30) Foreign Application Priority Data
May 14, 2015 (CN) .......................... 2015 1 0244490

(51) Int. Cl.
*G06K 9/00* (2006.01)

(52) U.S. Cl.
CPC ..... *G06K 9/00369* (2013.01); *G06K 9/00778* (2013.01)

(58) Field of Classification Search
None
See application file for complete search history.

(56) References Cited

U.S. PATENT DOCUMENTS

| 6,658,136 B1 * | 12/2003 | Brumitt | G06K 9/00771 382/103 |
| 2011/0142289 A1 * | 6/2011 | Barenbrug | G06T 7/136 382/107 |

(Continued)

OTHER PUBLICATIONS

Plan-view trajectory estimation with dense stereo background models. Darrell et al. 2001.*

(Continued)

*Primary Examiner* — Delomia L Gilliard
(74) *Attorney, Agent, or Firm* — Harness, Dickey & Pierce, P.L.C.

(57) ABSTRACT

Method, device, and non-transitory computer-readable medium detecting a gathering of objects based on stereo vision are disclosed, and the method comprises steps of obtaining current and prior images and a corresponding depth map; extracting foreground pixels corresponding to detection objects from the current and prior images, and projecting the foreground pixels onto a ground surface to acquire a foreground projection image including foreground projection blocks; conducting, based on image feature differences of the foreground pixels between the current and prior images, projection onto the ground surface to acquire moving foreground projection blocks; utilizing the moving foreground projection blocks to erode the foreground projection blocks to obtain still foreground projection blocks; and determining, based on the still foreground projection blocks, whether the gathering of objects exists.

11 Claims, 13 Drawing Sheets

(56) References Cited

U.S. PATENT DOCUMENTS

2015/0206004 A1* 7/2015 Liang .................. G06K 9/6212
382/103
2015/0294496 A1* 10/2015 Medasani .............. H04N 7/181
348/159

OTHER PUBLICATIONS

T. Darrell, D. Demirdjian, N. Checka, P. Felzenszwalb, "Plan-view trajectory estimation with dense stereo background models", published by MIT Artificial Intelligence Lab Cambridge MA, IEEE, issued in 2001 pp. 1 to 8.

Michael Harville, "Stereo person tracking with adaptive plan-view templates of height and occupancy statistics", published by Hewlett-Packard Laboratories, 1501 Page Mill Rd, ms 1181, Palo Alto, CA 94304, USA, received Sep. 26, 2002; received in revised form Jun. 27, 2003; accepted Jul. 2, 2003, pp. 127 to 142.

* cited by examiner

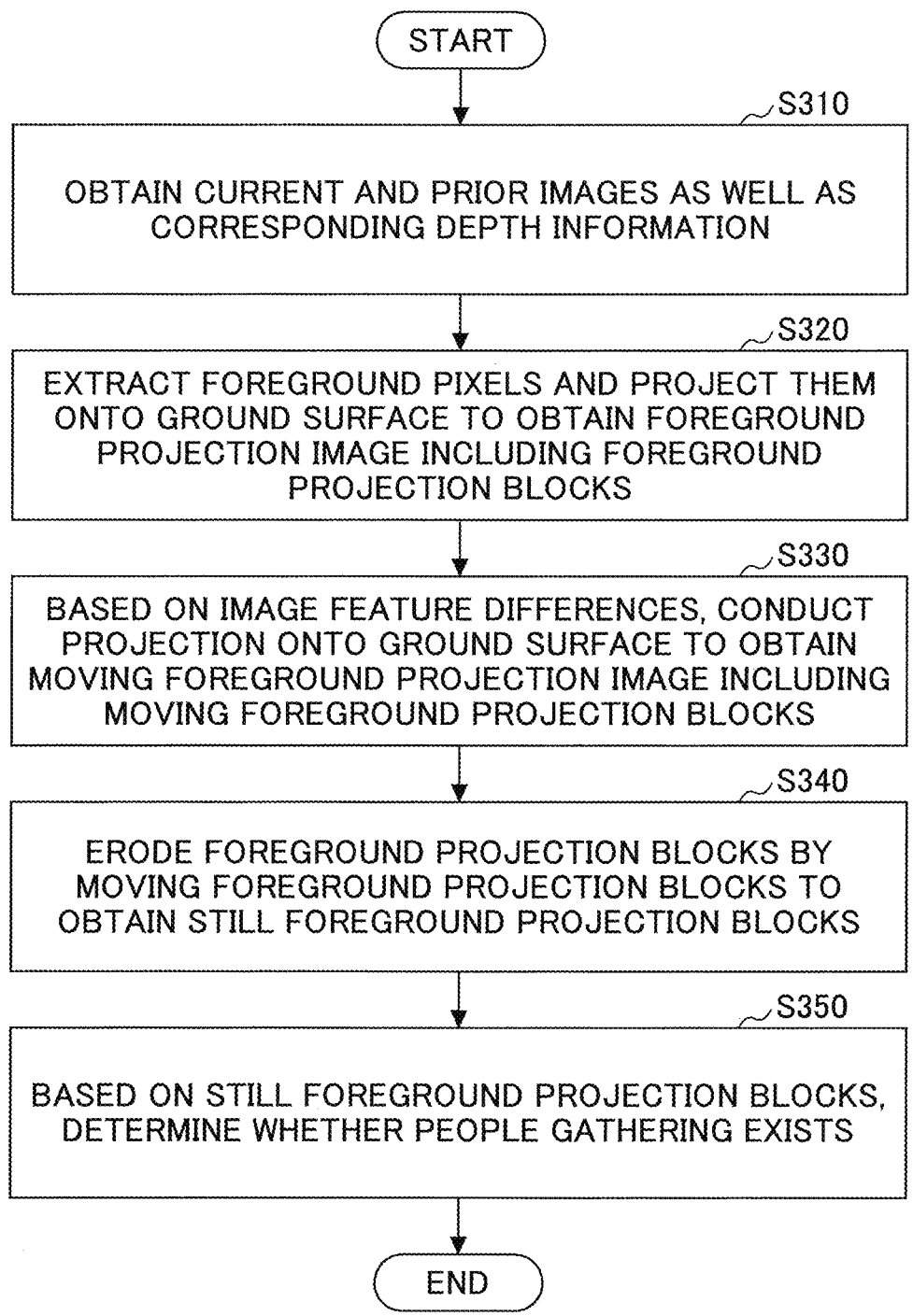

FIG.7
BINARY GRAYSCALE
DIFFERENCE IMAGE
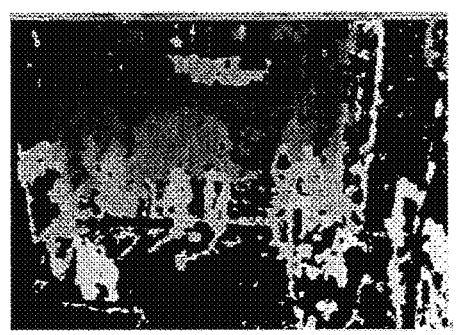
CORRESPONDING
DEPTH MAP
POINT
CLOUD
CONVER-
SION  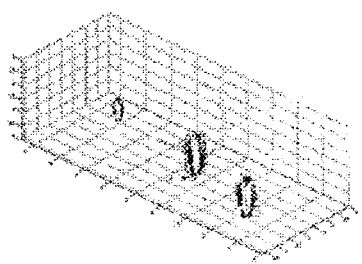 PROJECTION
ONTO
GROUND
SURFACE  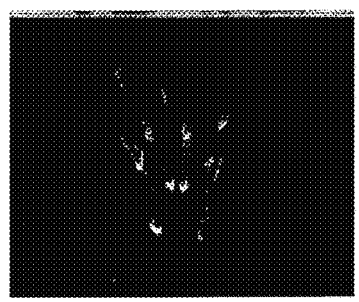

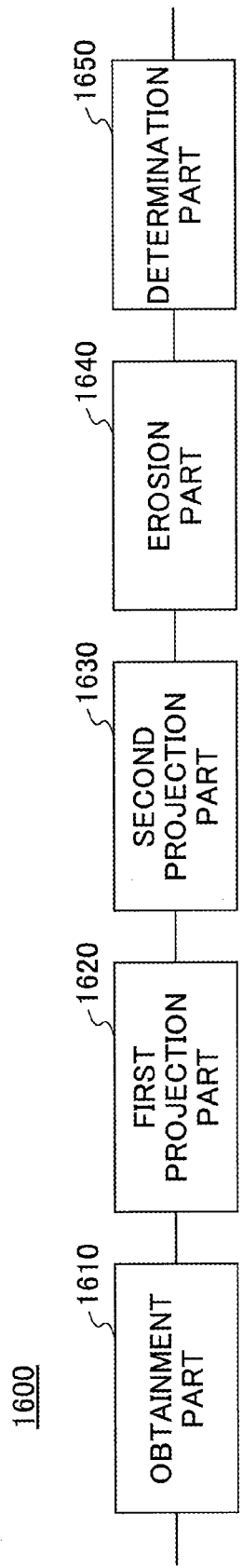
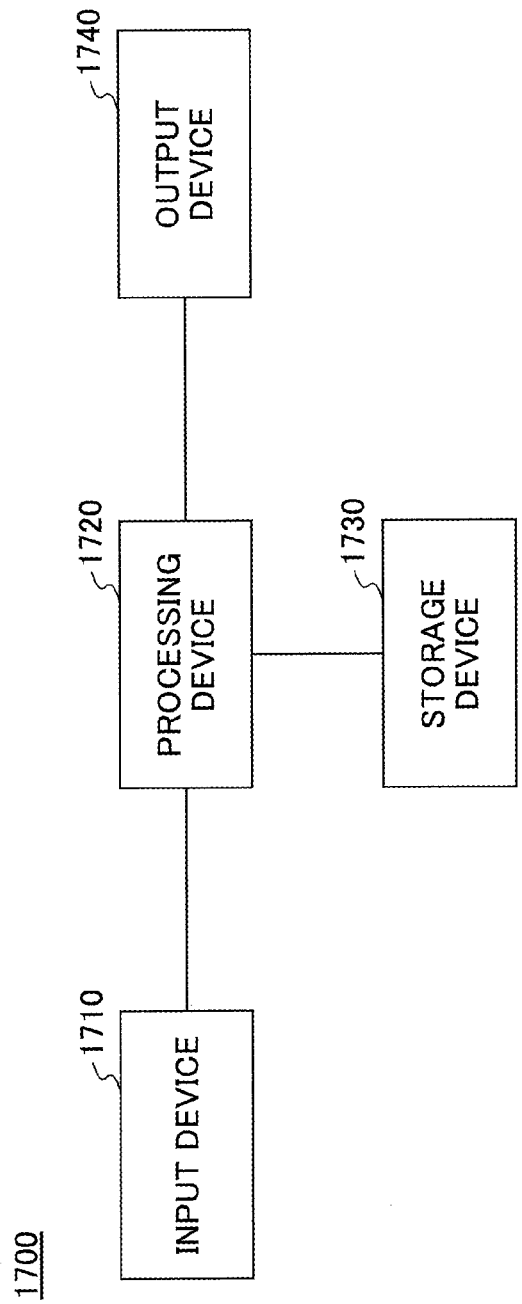

METHOD AND DEVICE FOR DETECTING
GATHERING OF OBJECTS BASED ON
STEREO VISION AS WELL AS
NON-TRANSITORY COMPUTER-READABLE
MEDIUM

BACKGROUND OF THE INVENTION

1. Field of the Invention

The present invention generally relates to the field of image and video processing, more particularly relates to a method and device for detecting in real time, based on stereo vision, whether there is a gathering of objects (hereinafter also called an "object gathering" for short sometimes) in a target scene.

2. Description of the Related Art

In the field of video monitoring, the analysis on the stream of people in a public area is one of the important research directions, and has a very wide application prospect. How to more efficiently conduct management with respect to the high-density stream of people so as to avoid an accident is a social problem attracting attention from the public. One of the important aspects of the analysis on the stream of people in the public area is the real-time detection and early warning of the gathering of people in order to avoid an accident such as a stampede. For example, generally speaking, if there is a medium or large-scale gathering of people in a security sensitive area such as a public square, that means an abnormal event may occur, and needs to be promptly reported to the security guards, etc.

However, there are still many challenges to achieving the real-time and accurate detection of the gathering of people in a real scene. For example, FIGS. 1A and 1B illustrate two examples of the gathering of people in a real scene, respectively. In the drawings, the high-density crowds of people, the overlaps between persons, the irregular lighting conditions, etc., are unfavorable factors which may negatively affect the relevant detection. At present, the conventional methods of detecting the gathering of people based on video vision are mainly divided into the following two classes.

(1) Method Based on Person Detection and Tracking

In this method, the detection of the gathering of people is realized by detecting and tracking individuals. The number of persons is counted according to the detection result, and the states (e.g., standing or moving) of the persons are recognized by a detection and tracking algorithm. As such, this kind of method is usually only suitable for detecting a low-density crowd of people. That is, in a real scene, the complicate background, the overlaps of persons, the lighting conditions, etc., may cause the detection and tracking algorithm to be invalid, so that it is impossible to obtain an accurate result.

(2) Method Based on Low-Level Image Features

In this method, first a background model of a scene is established, and then, the foreground (i.e., persons) of the scene is acquired by utilizing background subtraction. After that, by adopting a regression algorithm whose input may be the features extracted from the foreground such as the number of pixels therein, the length thereof, and the texture therein, it is possible to estimate the number of persons in the foreground. Additionally, in order to distinguish between motion and stillness of the persons, optical flow is usually used for estimation. However, when estimating the number of persons, since this kind of method is sensitive to the influence caused by the complicate background, the overlaps between persons, the perspective projection distort of the camera used, etc., it is difficult to get an accurate result.

Moreover, the motion estimation based on optical flow is a very time consuming process; as such, in a case without an additional hardware device for speeding up the relevant calculation, it is difficult to satisfy the demand of timeliness. On the other hand, the accuracy of the motion estimation is also subject to the lighting conditions, the image resolution, the distance to the camera used, etc.

SUMMARY OF THE INVENTION

In light of the above, it is preferred to provide a method and device which may efficiently and accurately conduct real-time detection with respect to the gathering of objects.

According to a first aspect of the present invention, a method of detecting a gathering of objects based on stereo vision is provided. The method includes:

an obtainment step of obtaining a current image and a prior image of a target scene as well as a corresponding depth map;

a first projection step of extracting foreground pixels corresponding to detection objects from the current and prior images, and then, projecting, based on corresponding depth information, the foreground pixels corresponding to the detection objects onto a ground surface so as to acquire a foreground projection image including foreground projection blocks;

a second projection step of conducting, based on image feature differences of the foreground pixels corresponding to the detection objects between the current and prior images, projection onto the ground surface to acquire moving foreground projection blocks indicating motion of the detection objects so as to get a moving foreground projection image;

an erosion step of utilizing the moving foreground projection blocks to erode the foreground projection blocks so as to obtain still foreground projection blocks; and a determination step of determining, based on the still foreground projection blocks, whether the gathering of objects exists.

According to a second aspect of the present invention, a device for detecting a gathering of objects based on stereo vision is provided. The device includes:

an obtainment part configured to obtain a current image and a prior image of a target scene as well as a corresponding depth map;

a first projection part configured to extract foreground pixels corresponding to detection objects from the current and prior images, and then, projecting, based on corresponding depth information, the foreground pixels corresponding to the detection objects onto a ground surface so as to acquire a foreground projection image including foreground projection blocks;

a second projection part configured to conduct, based on image feature differences of the foreground pixels corresponding to the detection objects between the current and prior images, projection onto the ground surface so as to acquire moving foreground projection blocks indicating motion of the detection objects;

an erosion part configured to utilize the moving foreground projection blocks to erode the foreground projection blocks so as to obtain still foreground projection blocks; and a determination part configured to determine, based on the still foreground projection blocks, whether the gathering of objects exists.

According to a third aspect of the present invention, a non-transitory computer-readable medium is provided, the non-transitory computer-readable medium having computer-executable instructions for execution by a processing system, in which, the computer-executable instructions, when executed, cause the processing system to carry out the method described above.

Therefore, according to the method and device for detecting the gathering of objects, regarding a target scene image, by utilizing the depth information therein to project the foreground and the moving foreground therein on the ground surface so as to get a foreground projection image and a moving foreground projection image, then eroding the foreground projection image by using the moving foreground projection image so as to acquire a still foreground projection image, and then, based on the still foreground projection image, determining whether these is a gathering of objects, it is possible to achieve more efficient and accurate real-time detection.

BRIEF DESCRIPTION OF THE DRAWINGS

FIG. 3 is a flowchart of a method of detecting the gathering of objects based on stereo vision according to an embodiment of the present invention;

FIG. 7 illustrates an example of a process of converting the white pixels in a binary grayscale difference image into point clouds on the basis of the related depth information, and then projecting the point clouds onto the ground surface so as to obtain a difference projection image;

FIG. 16 illustrate a device for detecting the gathering of objects based on stereo vision according to an embodiment of the present invention; and FIG. 17 illustrates a system for conducting detection with respect to the gathering of objects based on stereo vision according to an embodiment of the present invention.

DETAILED DESCRIPTION OF THE PREFERRED EMBODIMENTS

In order to let those people skilled in the art better understand the present invention, hereinafter, the embodiments of the present invention will be concretely described with reference to the drawings. However it should be noted that the same symbols, which are in the specification and the drawings, stand for constructional elements having basically the same function and structure, and repeated explanations for the constructional elements are omitted.

As described above, the detection of the gathering of people in a real scene mainly includes two aspects, i.e., the estimation of the number of persons and the estimation of the motion of persons. As such, first the difference between a gathered crowd of people and a passing-by crowd of people will be explained by referring to FIGS. 2A and 2B.

Figure 1A:
FIGS. 1A and 1B illustrate two examples of the gathering of people in a real scene, respectively.
Figure 1B:
Figure 2A:
FIGS. 2A and 2B illustrate an example of a gathered crowd of people and an example of a passing-by crowd of people, respectively.
Figure 2B:

FIGS. 2A and 2B illustrate an example of a gathered crowd of people and an example of a passing-by crowd of people, respectively.

As shown in FIG. 2A, the crowd of people in the circle is called a "passing-by crowd of people". That is, although the people in the circle are gathered, they just pass by there, i.e., do not stop there. On the contrary, in FIG. 2B, the people in the circle are gathered and stop there, and have only a little body sway. This kind of crowd of people is called a "gathered crowd of people", and needs to be detected in the embodiments of the present invention. On the basis of this, it is apparent that the key for distinguishing between the two kinds crowds of people is recognizing the motion of persons.

Again, as described above, there usually exist the overlaps between persons in the gathered crowd of people. Additionally, the conventional methods of detecting the gathering of objects based on person detection and tracking are conducted with respect to color or gray images which do not have enough depth information, thereby resulting in incorrect results.

In the light of the above, a method and device for detecting the gathering of objects based on stereo vision are proposed in the embodiments of the present invention. In particular, by projecting the foreground and the moving foreground in a target scene image needing to be detected onto the ground surface according to the corresponding depth information, then eroding the projected portion of the moving foreground in the projected image of the foreground so as to get a still foreground projection image, and then, based on the still foreground projection image, determining whether there is a gathering of objects, it is possible to achieve more efficient and accurate real-time detection.

Hereinafter the embodiments of the present invention will be described in detail by referring to the drawings.

FIG. 3 is a flowchart of a method of detecting the gathering of objects based on stereo vision according to an embodiment of the present invention.

As shown in FIG. 3, the method may include STEPS S310 to S350, i.e., an obtainment step S310, a foreground projection step (also called a "first projection step") S320, a moving foreground projection step (also called a "second projection step") S330, an erosion step S340, and a determination step S350.

The obtainment step S310 is obtaining the input image related to a current frame of a target scene (also called a "current image"), the input image related to a frame at a time point before a predetermined time interval from the current frame (also called a "prior image"), and corresponding depth information.

The first projection step S320 is extracting the foreground pixels corresponding to the objects to be detected (i.e., detection objects) from the current and prior images, and then, based on the corresponding depth information, projecting the foreground pixels corresponding to the detection objects onto the ground surface so as to get a foreground projection image including foreground projection blocks.

The second projection step S330 is conducting, based on the image feature differences of the foreground pixels corresponding to the detection objects between the current and prior images, projection onto the ground surface to get moving foreground projection blocks indicating the motion of the detection objects so as to acquire a moving foreground projection image.

The erosion step S340 is utilizing the moving foreground projection blocks to erode the foreground projection blocks so as to obtain still foreground projection blocks. Here it should be noted that the meaning of erosion will be depicted in detail below.

The determination step S350 is determining, based on the still foreground projection blocks, whether there is a gathering of objects.

In what follows, the method shown in FIG. 3 will be depicted in particular.

In STEP S310 of FIG. 3, the input images (i.e., the current and prior images) of a target scene and the corresponding depth information are obtained. It is possible to use a camera to photograph the target scene so as to obtain the input images, or to get the input images via a network or in any other proper way. Alternatively, the input images may be ones among the video shots captured by a video camera. In a case of real-time monitoring, the input images may also be acquired by a camera in real time.

The input images available to the embodiments of the present invention may include but are not limited to color images, grayscale images, depth maps, disparity maps, etc. In a case where the input images are depth or disparity maps, it is possible to directly acquire the corresponding depth information. In a case where the input images are color and/or grayscale images, it is also possible to get the corresponding depth information. For example, a two-lens camera may be used in this case so as to obtain the depth information. Since this is well known to those skilled in the art, the detailed explanation is omitted here. Additionally it should be noted that hereinafter the grayscale images serve as the input images for illustration, but the present invention is not limited to this.

As such, in STEP S310 of FIG. 3, the obtained input images may include the input image of a current frame and the input image of a prior frame, and the depth information corresponding to the current and prior images are also acquired.

Hereinafter a gathered crowd of people is taken as an example for illustration; however, the present invention is not limited to this.

As described above, one of the keys for detecting the gathering of people is distinguishing between the passing-by crowd of people and the gathered crowd of people. In order to determine whether there exists a passing-by crowd of people in the input images (i.e., in the target scene), it is necessary to determine, by referring to the input image of the prior image, whether there exists the motion of persons. This will be depicted in the detailed description related to STEP S330 of FIG. 3 below. For this reason, first it is necessary to obtain the input images of the current and prior frames.

Here it should be noted that the current and prior frames may not be continuous ones, and the time interval between the two may be a predetermined one. In the followings, an input image at a time point T serves as the current image, and an input image at a time point T-1 serves as the prior image. However, those skilled in the art should know that this is just an example; that is, the time interval between the current and prior images may be predetermined according to the actual application environment.

In STEP S320 of FIG. 3, the foreground pixels corresponding to the detection objects (i.e., the gathered crowd of people to be detected) in the current and prior images are extracted, and then, on the grounds of the corresponding depth information, the foreground pixels corresponding to the gathered crowd of people are projected onto the ground surface so as to get a foreground projection image including foreground projection blocks.

At present, the well-used methods of extracting a foreground are mainly based on background subtraction. The basic idea is establishing a background model for a target scene in advance, and then, subtracting the background model from the current input image of the target scene so as to obtain the foreground region. However in the embodiments of the present invention, it is possible to adopt any proper background modeling approach. For example, a static background modeling approach or a dynamic background modeling approach such as a GMM (Gaussian Mixture Model) based one may be adopted.

After extracting the foreground pixels corresponding to the people in the input images, it is possible to project, on the basis of the corresponding depth information, the foreground pixels onto the ground surface so as to acquire a foreground projection image including foreground projection blocks.

Figure 4:
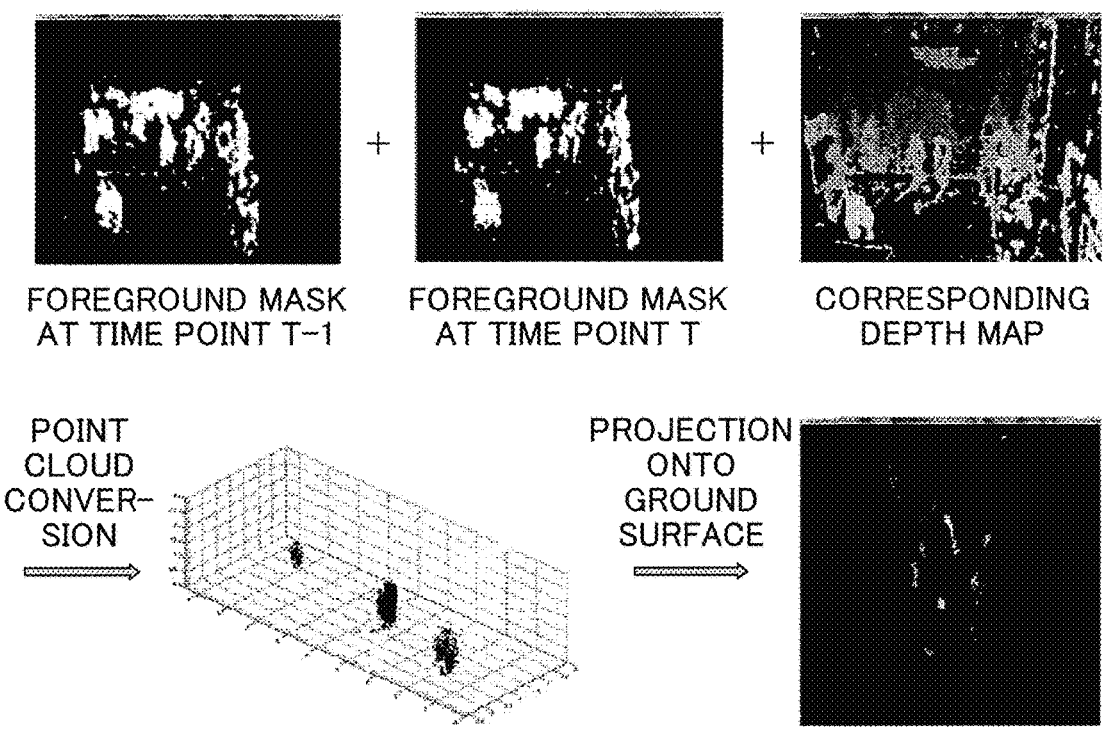
FIG. 4 illustrates an example of a process of obtaining a foreground projection image.

FIG. 4 illustrates an example of a process of obtaining the foreground projection image.

As shown in FIG. 4, it is possible to respectively use the depth information of the current (at the time point T) and prior (at the time point T-1) images to convert the foreground pixels extracted from the current image (i.e., the foreground mask at the time point T) and the foreground pixels extracted from the prior image (i.e., the foreground mask at the time point T-1) into point clouds in a same real three-dimensional space, and then, to project the point clouds onto the ground surface so as to acquire the foreground projection image. The foreground projection image includes the foreground projection blocks which are generated by the superposition of the current and prior images.

Again, as described above, in order to detect whether there is a gathered crowd of people, it is necessary to remove the portion corresponding to the moving people (i.e., the so called "passing-by crowd of people") from the foreground projection blocks, and in order to determine whether there exists the motion of persons, it is necessary to refer to the current and prior images. Hence, in STEP S330 of FIG. 3, on the ground of the image feature differences of the foreground pixels corresponding to the people between the current and prior images, it is possible to conduct projection onto the ground surface to get moving foreground projection blocks which represent the motion of people, so as to get a moving foreground projection image.

The image feature of the foreground pixels available to the embodiments of the present invention may include but is not limited to a color feature, a grayscale feature, etc. For example, if there is a change between this kind of image features of a foreground pixel in the current and prior images, then that means this foreground pixel is a moving one. As such, by utilizing the corresponding depth information to project all the moving foreground pixels onto the ground surface, it is possible to obtain the moving foreground projection blocks representing the motion of people so as to get the moving foreground projection image.

Hereinafter two approaches of obtaining a moving foreground projection image proposed in the embodiments of the present invention will be depicted in detail.

Figure 5:
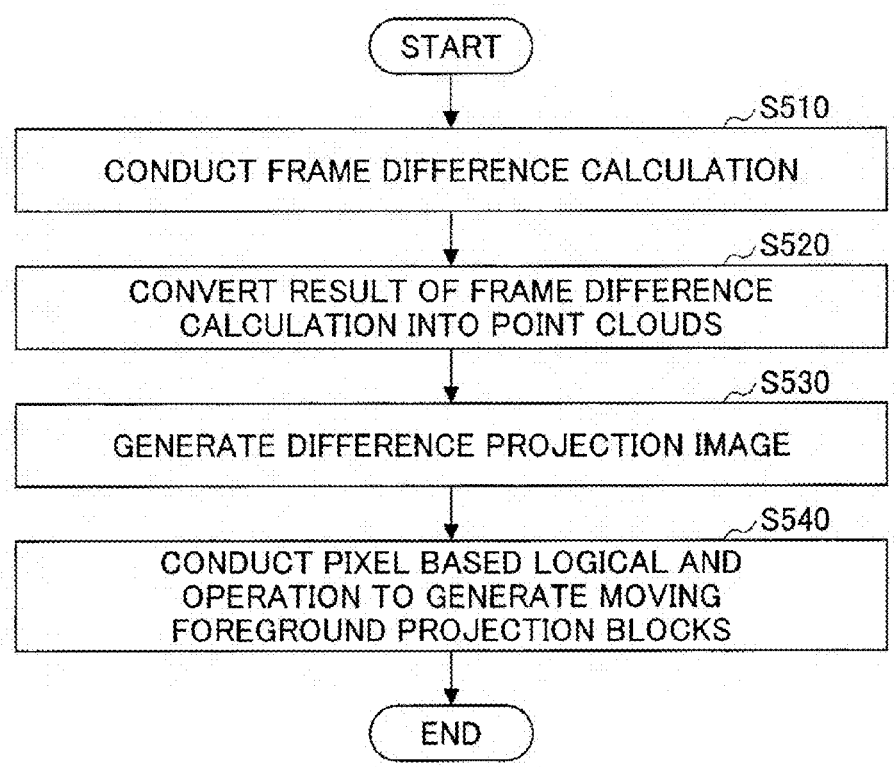
FIG. 5 is a flowchart of a difference projection approach of acquiring a moving foreground projection image, proposed in the embodiments of the present invention.

FIG. 5 is a flowchart of a difference projection approach of acquiring a moving foreground projection image, proposed in the embodiments of the present invention.

As shown in FIG. 5, the difference projection approach may include STEPS S510 to S540.

In STEP S510 of FIG. 5, a frame difference calculation is conducted with respect to the image feature of the current and prior images.

In STEP S520 of FIG. 5, the result of the frame difference calculation is converted into point clouds in the three-dimensional world coordinate system by utilizing the corresponding depth information.

In STEP S530 of FIG. 5, the point clouds are projected onto the ground surface so as to generate a difference projection image.

In STEP S540 of FIG. 5, logical AND operation is carried out with respect to the pixels of the difference projection image and the foreground projection image so as to generate moving foreground projection blocks.

In what follows, the difference projection approach shown in FIG. 5 will be described in detail.

In STEP S510 of FIG. 5, it is possible to conduct pixel based frame difference calculation with respect to an image feature between the current and prior images. For example, in a case where the input images (i.e., the current and prior images) are grayscale ones, it is possible to adopt the grayscale level of each pixel to carry out frame difference calculation. After that, thresholding is performed on the difference of the grayscale level of each pixel. That is, regarding the difference of the grayscale level of each pixel, if its value is greater than or equal to a predetermined threshold, the value of the corresponding pixel is set to one; otherwise, the value of the corresponding pixel is set to zero. In this way, it is possible to obtain a binary image which is called a "binary grayscale difference image" here.

Figure 6:
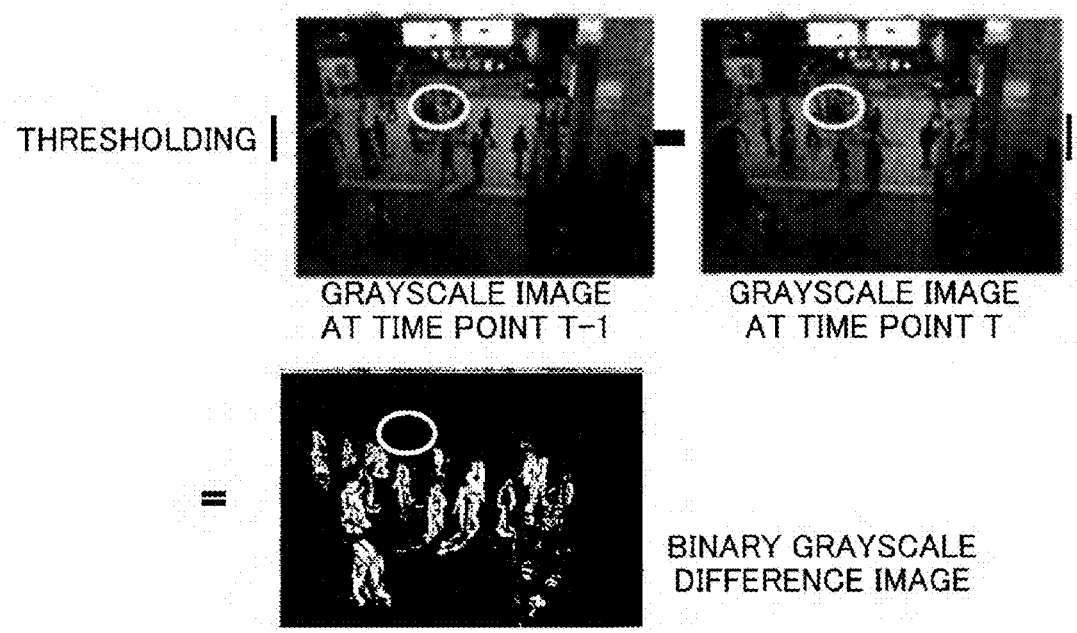
FIG. 6 illustrates an example of a binary grayscale difference image obtained on the grounds of two grayscale images at time points T and T-1.

FIG. 6 illustrates an example of a binary grayscale difference image obtained on the grounds of the grayscale images at the time points T and T-1.

As shown in FIG. 6, the white pixels whose values are one in the binary grayscale difference image mean that their corresponding points move between the time points T-1 and T. Additionally, in each of the three images in this drawing, the circle marks the position of the gathered crowd of people.

Here it should be noted that, compared to a person who is walking, the gathered crowd of people is relatively still, so the result of the pixel based frame difference calculation is relatively small. Consequently, if a threshold is properly selected, then the binary grayscale difference image obtained after thresholding may not have any white pixel corresponding to the gathered crowd of people. The threshold may be predetermined based on an empirical value or the actual application environment.

In addition, although the grayscale images are taken for illustration, the pixel based frame difference calculation is also available to color images, depth maps, disparity maps, etc. Accordingly, the image feature used for the pixel based frame difference calculation may be color information, depth information, disparity information, etc., and the threshold used for the thresholding process may also be predetermined based on an empirical value or the actual application environment.

Next, in STEP S520 of FIG. 5, the corresponding depth information is utilized so as to convert the result of the frame difference calculation into point clouds in the three-dimensional world coordinate system. For example, in a case of the above-described binary grayscale difference image, on the grounds of the corresponding depth information at the time points T-1 and T, it is possible to convert the white pixels in the binary grayscale difference image obtained after thresholding into point clouds in the three-dimensional world coordinate system.

And then, in STEP S530 of FIG. 5, the point clouds are projected onto the ground surface in the three-dimensional world coordinate system so as to generate a difference projection image.

FIG. 7 illustrates an example of a process of converting the white pixels in a binary grayscale difference image into point clouds on the basis of the related depth information, and then projecting the point clouds on the ground surface so as to obtain a difference projection image.

After that, in STEP S540 of FIG. 5, logical AND operation is carried out with respect to the difference projection image and the foreground projection image so as to generate moving foreground projection blocks. As described above, the white pixels in the binary difference projection image indicate that there may exist the motion of persons, and the motion amplitudes exceed a predetermined threshold so that some slight body swings in the still crowd of people are filtered. The foreground projection blocks in the foreground projection image obtained in STEP S320 of FIG. 3 represent a latent region of the gathered crowd of people which is a candidate region for detecting the gathered crowd of people. As such, on the basis of these two projection images, by conducting pixel based logical AND operation, it is possible to get another image which is called a "moving foreground projection image" here.

The reason of conducting the pixel based logical AND operation with respect to the difference projection image and the foreground projection image is as follows. The frame difference calculation is performed on all the current and prior images, so that a change between the two input images caused by the change of environmental lighting may be introduced, for example, due to the sway of a tree. As such, by carrying out the pixel based logical AND operation with respect to the foreground projection blocks obtained above and the difference projection image obtained in STEP S530 of FIG. 5, it is possible to filter (remove) a region(s) related to the motion of non-persons in the moving foreground projection image.

Figure 8:
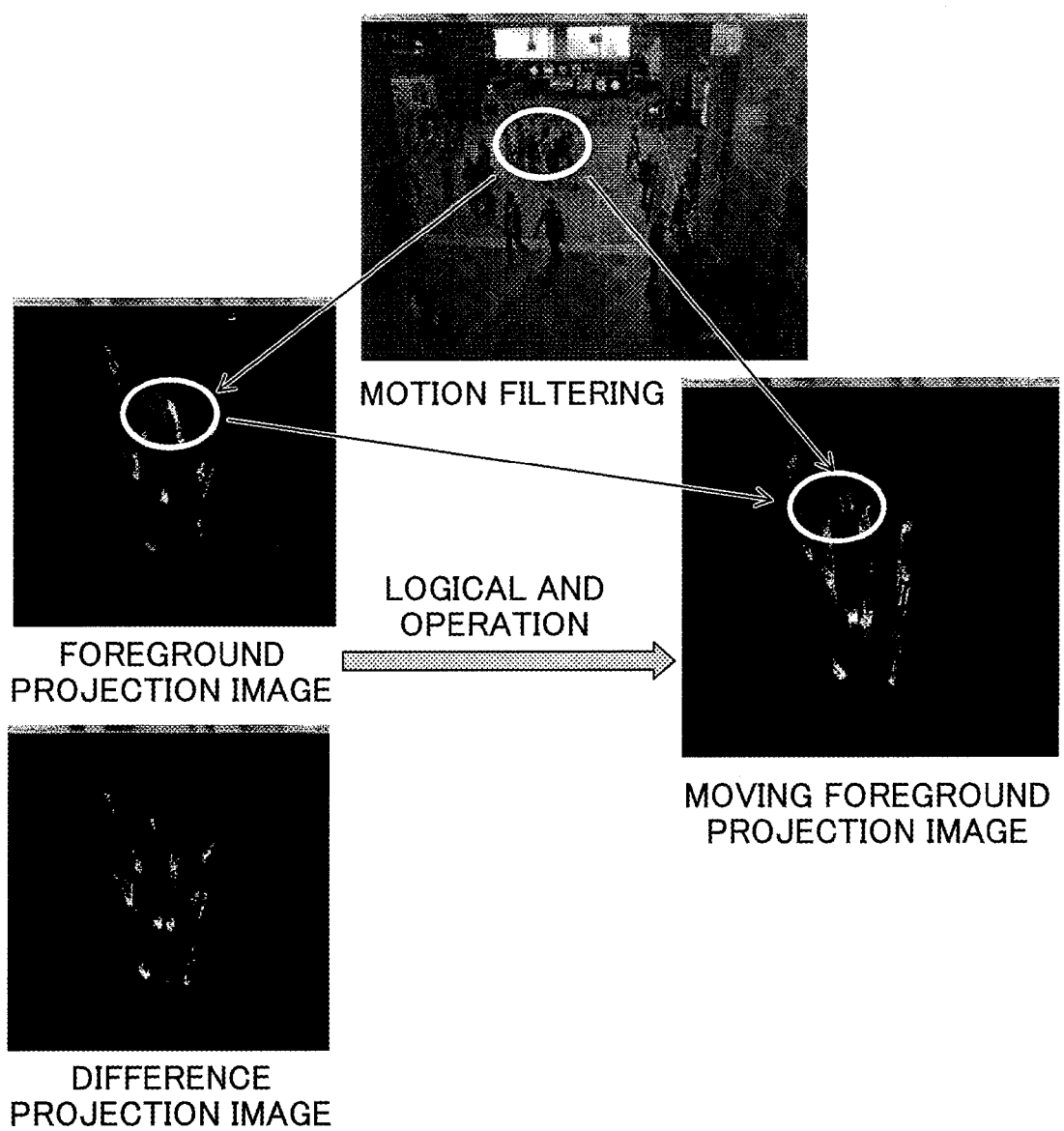
FIG. 8 illustrates an example of a result of conducting pixel based logical AND operation with respect to a difference projection image and a foreground projection image.

FIG. 8 illustrates an example of a result of conducting pixel based logical AND operation with respect to a difference projection image and a foreground projection image.

As shown in FIG. 8, the circle in the image at the top indicates a gathered crowd of people. By performing this kind of pixel based logical operation, the projection block in the foreground projection image corresponding to the gather crowd of people is removed by the difference projection image, so that it is possible to acquire a moving foreground projection image.

Here it should be noted that what a moving foreground projection image reflects is the region(s) of the motion of persons on a bird's-eye view (i.e., a top view). Additionally, after conducting normalization based on the related depth information, the size of the motion region is unrelated to the distances to the persons. This is good for improving the accuracy of detecting the gathering of peoples.

As a result, according to the difference projection approach shown in FIG. 5, it is possible to obtain the image feature changes of pixels between the current and prior images, then to convert, by utilizing the corresponding depth information, the pixels having the image feature changes into point clouds in the three-dimensional world coordinate system, and then, to project the point clouds onto the ground surface so as to get a moving foreground projection image.

However, on the other hand, it is also possible to first convert the foreground pixels in the current and prior images into point clouds in the three-dimensional world coordinate system, and then, on the grounds of the image feature changes of the point clouds corresponding to the current and prior images, to determine moving foreground projection blocks as follows.

Figure 9:
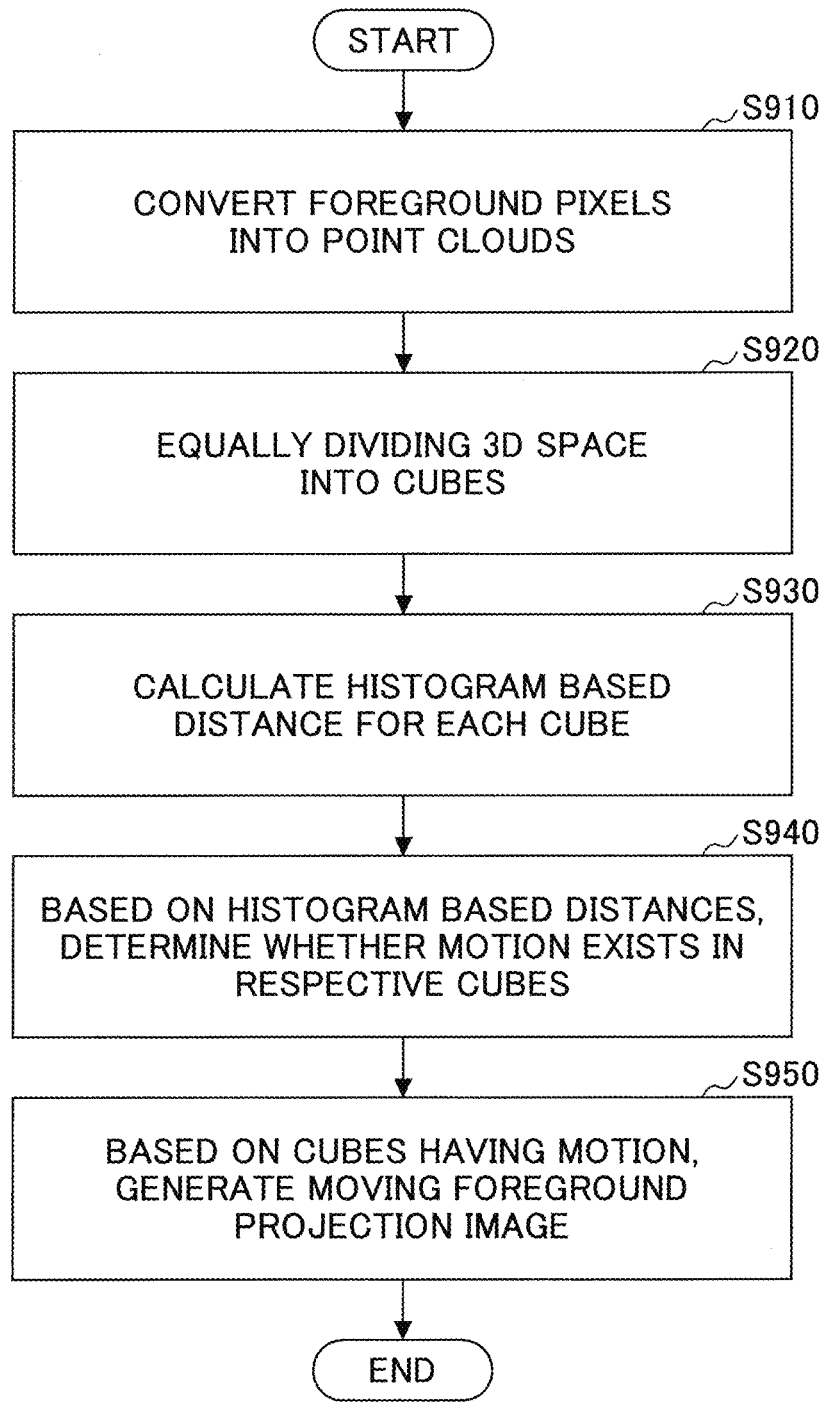
FIG. 9 is flowchart of a cube related histogram based approach of acquiring a moving foreground projection image, proposed in the embodiments of the present invention.

FIG. 9 is a flowchart of a cube related histogram based approach of acquiring a moving foreground projection image, proposed in the embodiments of the present invention.

As shown in FIG. 9, the cube related histogram based approach may include STEPS S910 to S950.

In STEP S910 of FIG. 9, the foreground pixels extracted from the current and prior image are converted, by utilizing the corresponding depth information, into point clouds in the three-dimensional world coordinate system, respectively.

Next, in STEP S920 of FIG. 9, a predetermined space defined by the three-dimensional world coordinate system is equally divided into plural small cubes.

And then, in STEP S930 of FIG. 9, regarding each small cube, an image feature histogram of the point clouds therein corresponding to the current and prior images is acquired, and a histogram based distance related to the current and prior images is calculated.

After that, in STEP S940 of FIG. 9, regarding each small cube, on the basis of the corresponding histogram based distance, it is determined whether there is motion between the current and prior images in the corresponding small cube.

Finally, in STEP S950 of FIG. 9, on the grounds of those small cubes having the motion, a moving foreground projection image is generated.

In what follows, the cube related histogram based approach shown in FIG. 9 will be depicted in particular.

Figure 10:
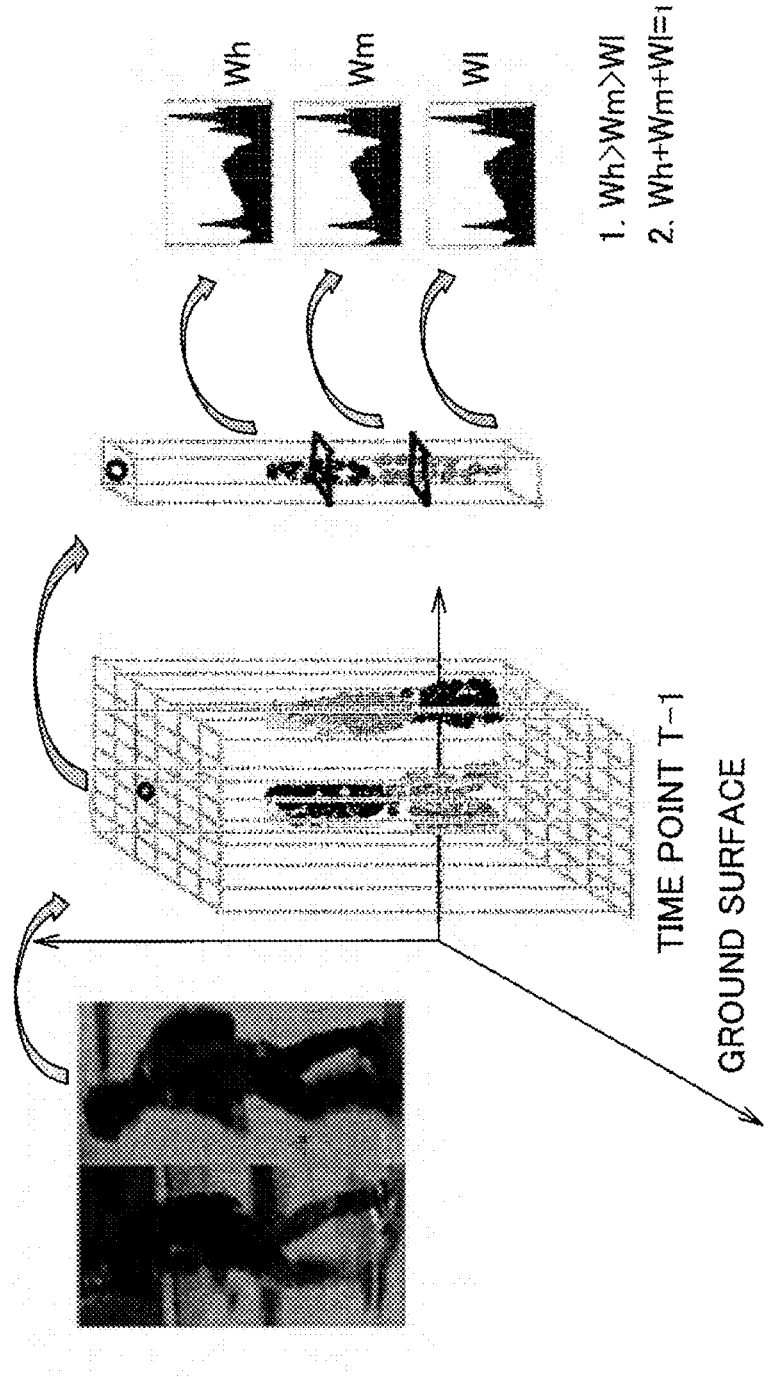
FIGS. 10 and 11 illustrate an example of a process of calculating a histogram based distance in the cube related histogram based approach shown in FIG. 9.
Figure 11:
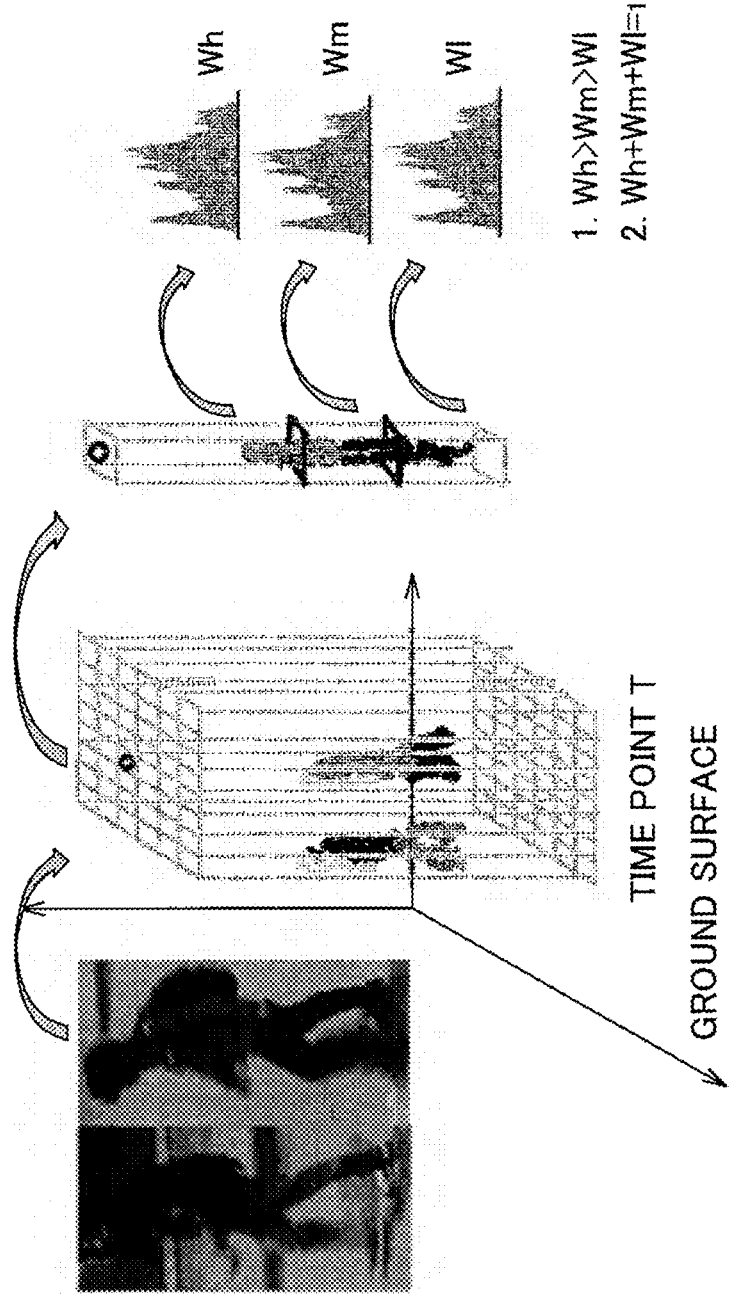

FIGS. 10 and 11 illustrate an example of a process of calculating a histogram based distance in the cube related histogram based approach shown in FIG. 9.

As shown in FIGS. 10 and 11, the first images from the left (i.e., the prior and current images) include two persons in the target scene at the time points T-1 and T, respectively, and the second images from the left contain the point clouds related to the two persons in the three-dimensional world coordinate system at the time points T-1 and T, respectively. Additionally the predetermined space defined by the three-dimensional coordinate system in each of the second images from the left is equally divided into plural small cubes.

In STEP S930 of FIG. 9, regarding each small cube, an image feature histogram of the point clouds therein corresponding to the current and prior images is acquired. In an example in which the input images are grayscale ones, the grayscale levels of the point clouds in each small cube may be obtained so as to acquire a corresponding grayscale histogram. In another example in which the input images are color ones, the color values (e.g., the color values of R, G, and B channels) of the point clouds in each small cube may be obtained so as to acquire a corresponding color histogram. Of course, the present invention is not limited to this.

Actually, considering that the possibility of a higher portion of a human body such as a shoulder thereof to be overlapped is relatively low, and the possibility of a lower portion of the human body such a foot thereof to be overlapped is relatively high. As such, for each small cube, it is also possible to further divide it into plural sub cubes, and to give a weight value to each sub cube. In general, a larger weight value is given to a higher sub cube, and a smaller weight value is given to a lower sub cube. After that, regarding each sub cube, an image feature histogram of the points therein is acquired.

Referring again to FIGS. 10 and 11; the third images from the left illustrate that the small cube marked by the small black circle is divided into three sub cubes from top to bottom, respectively. And the fourth images from the left show the acquired histograms related to the three sub cubes at the time points T-1 and T as well as their weight values Wh, Wm, and Wl, respectively. Here, Wh>Wm>Wl, and Wh+Wm+Wl=1.

According to FIGS. 10 and 11, it is obvious that in the predetermined space defined by the three-dimensional coordinate system at the time point T-1, the person on the left side is passing through the small cube space marked by the small black circle. And in the predetermined space defined by the three-dimensional coordinate system at the time point T, the person on the left side has passed through the small cube space, and the person on the right side is passing through the small cube space. Since the cloth colors of the two persons are different, there is a change (e.g., a color/grayscale change) between the histograms (e.g., a color/grayscale histogram) of the point clouds in each sub cube of the small cube at the time points T-1 and T.

As such, it is possible to calculate the distances between the histograms corresponding to the plural sub cubes in each small cube at the time points T-1 and T, respectively, and then, to determine the sum of them based on the corresponding weight values so as to serve as the histogram based distance D relate to this small cube between the time points T-1 and T, as expressed by the following equation.

$$D = Wh \times \text{Dist}(\text{Hist}_{hVol,T}, \text{Hist}_{hVol,T+1}) + Wm \times \text{Dist}(\text{Hist}_{mVol,T}, \text{Hist}_{mVol,T+1}) + Wl \times \text{Dist}(\text{Hist}_{lVol,T}, \text{Hist}_{lVol,T+1})$$

Here, Wh, Wm, and Wl respectively represent the weight values assigned to the three sub cubes from top to bottom in each of FIGS. 10 and 11; Hist indicates a histogram related to each sub cube; and dist(•) refers to calculating the distance between two histograms. Additionally, if the histograms are color ones, then the histogram based distance is a color information based one, and similarly, if the histograms are grayscale ones, then the histogram based distance is a grayscale information based one.

In general, regarding persons in a rest state, since the image feature changes of the point cloud in the respective small cubes that the persons occupy at the time points T-1 and T are relatively small, the histogram based distances calculated according to the above-described equation are relatively small; on the contrary, regarding persons in a moving state, the histogram based distances calculated according to the above-described equation are relatively large. That is, the histogram based distances may serve as indices for determining whether there are persons who are moving, so as to distinguish between the gathered crowd of people and the passing-by crowd of people.

Hence, in STEP S940 of FIG. 9, it is possible to determine, on the basis of the histogram based distances, whether there exists motion between the prior and current images in the respective small cubes. For example, a threshold may be predetermined so that if a small cube whose relevant histogram based distance is greater than or equal to the predetermined threshold, then it may be determined that the corresponding foreground pixels move between the prior and the current images (i.e., the small cube has motion);

otherwise, it may be determined that the corresponding foreground pixels do not move between the prior and current images (i.e., the small cube does not have motion).

After that, in STEP S950 of FIG. 9, it is possible to generate a moving foreground projection image on the grounds of the small cubes having the motion of persons. For example, they may be projected onto the ground surface in the three-dimensional world coordinate system to serve as the moving foreground projection blocks so as to acquire the moving foreground projection image.

Here it should be noted that although each small cube is divided into three sub cubes, the present invention is not limited to this. That is, each small cube may be divided into two, four, or more sub cubes, for instance. Of course, each small cube may also not be divided, i.e., serves as a single cube.

According to the cube related histogram based approach shown in FIG. 9, by converting the foreground pixels extracted from the current and prior images into point clouds in the three-dimensional space, it is possible to determine the moving foreground projection blocks on the ground of the image feature changes of the foreground pixels of the point clouds in the three-dimensional space between the current and prior images.

Since both the difference projection approach shown in FIG. 5 and the cube related histogram based approach shown in FIG. 9 may reflect the motion of persons on the related top view by utilizing the corresponding depth information, it is possible to reduce the influence caused by the overlaps between persons, the distances between the related camera and persons, etc., so that it is possible to more accurately recognize the motion of persons.

As a result, in STEP S330 of FIG. 3, it is possible to obtain the moving foreground projection image by carrying out projection onto the ground surface on the basis of the image feature differences of the foreground pixels corresponding to persons between the current and prior images.

Referring again to FIG. 3; in STEP S340, by utilizing the moving foreground projection blocks acquired in STEP S330 to erode the foreground projection blocks obtained in STEP S320, it is possible to get a still foreground projection image.

Here it should be noted that the erosion process is defined as follows. If a pixel in the moving foreground projection image is white (i.e., its value is non-zero), then the corresponding pixel in the foreground projection image is set to black (i.e., its value is zero).

Figure 12:
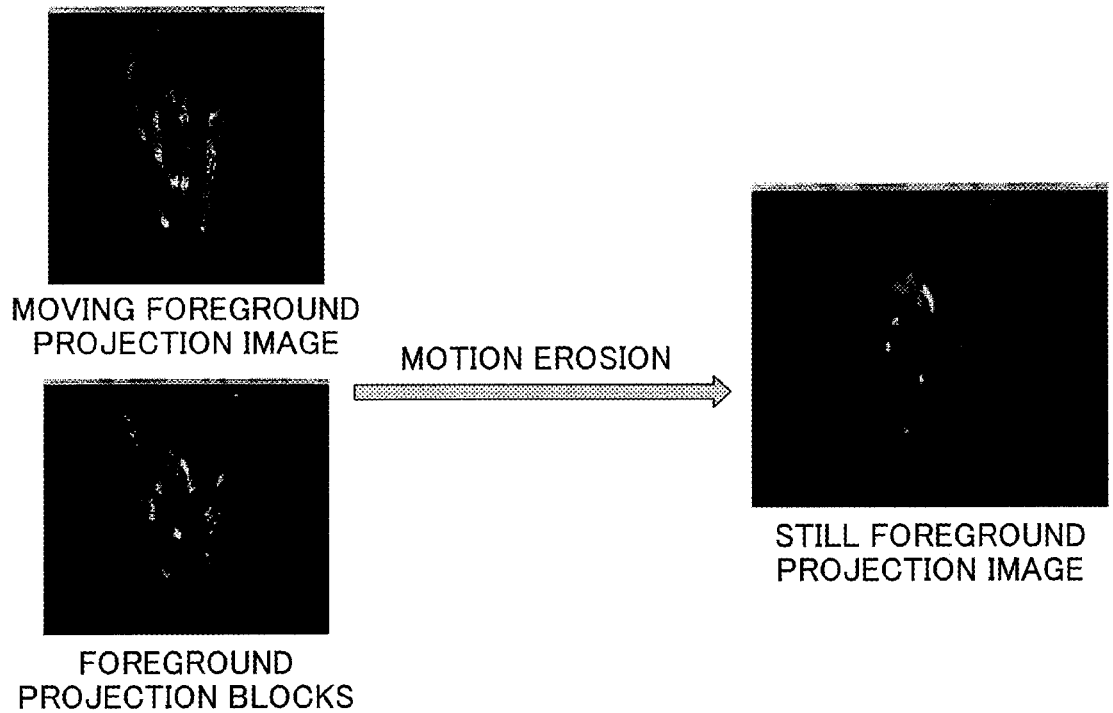
FIG. 12 illustrates an example of an erosion process.

FIG. 12 illustrates an example of the erosion process.

As shown in FIG. 12, after conducting the erosion process, the moving foreground portions in the foreground projection blocks are removed. Here the remaining blocks obtained after conducting the erosion process serves as still foreground projection blocks, and the projection image acquired after conducting the erosion process serves as the still foreground projection image in which the region represented by non-zero pixels (i.e., the still foreground projection blocks) indicates that there are persons in a state of rest therein, and they need to be determined whether to make up a gathered crowd of people.

As such, in STEP S350 of FIG. 3, on the ground of the still foreground projection blocks, it is determined whether there is a gathered crowd of people. For example, it is possible to first conduct clustering with respect to the neighboring ones among the still foreground projection blocks, and then, to determine whether there is a gathered crowd of people on the basis of the clustered still foreground projection blocks.

Figure 13:
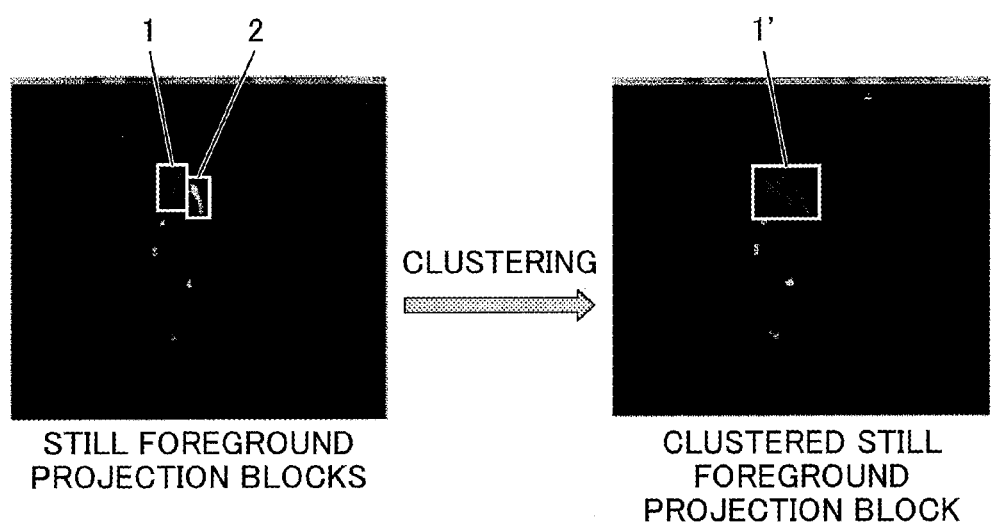
FIG. 13 illustrates an example of a clustering process.

FIG. 13 illustrates an example of the clustering process.

As shown in FIG. 13, the image on the left side is a still foreground projection image before clustering in which there are two still foreground projection blocks 1 and 2. And the image on the right is the still foreground projection image after clustering in which there is a still foreground projection block 1' which is a clustered one from the still foreground projection blocks 1 and 2.

Here it should be noted that it is possible to adopt any proper clustering approach, for example, a Connected Domain Analysis based one or a Mean Shift Algorithm based one.

In addition, although the clustering process which is conducted with respect to the still foreground projection blocks after the erosion process has been depicted, the clustering process may also be carried out before the erosion process. In particular, it is possible to cluster the foreground projection blocks obtained in STEP S320 of FIG. 3 so as to acquire foreground projection blocks after clustering. After that, in STEP S340 of FIG. 3, it is possible to utilize the moving foreground projection blocks to erode the foreground projection blocks after clustering so as to get still foreground projection blocks.

For example, a projection based height image and a projection based surface area image may be adopted for conducting clustering with respect to the still foreground projection blocks. First the projection based height image and the projection based surface area image will be briefly described by referring to FIG. 14 as follows.

Figure 14:
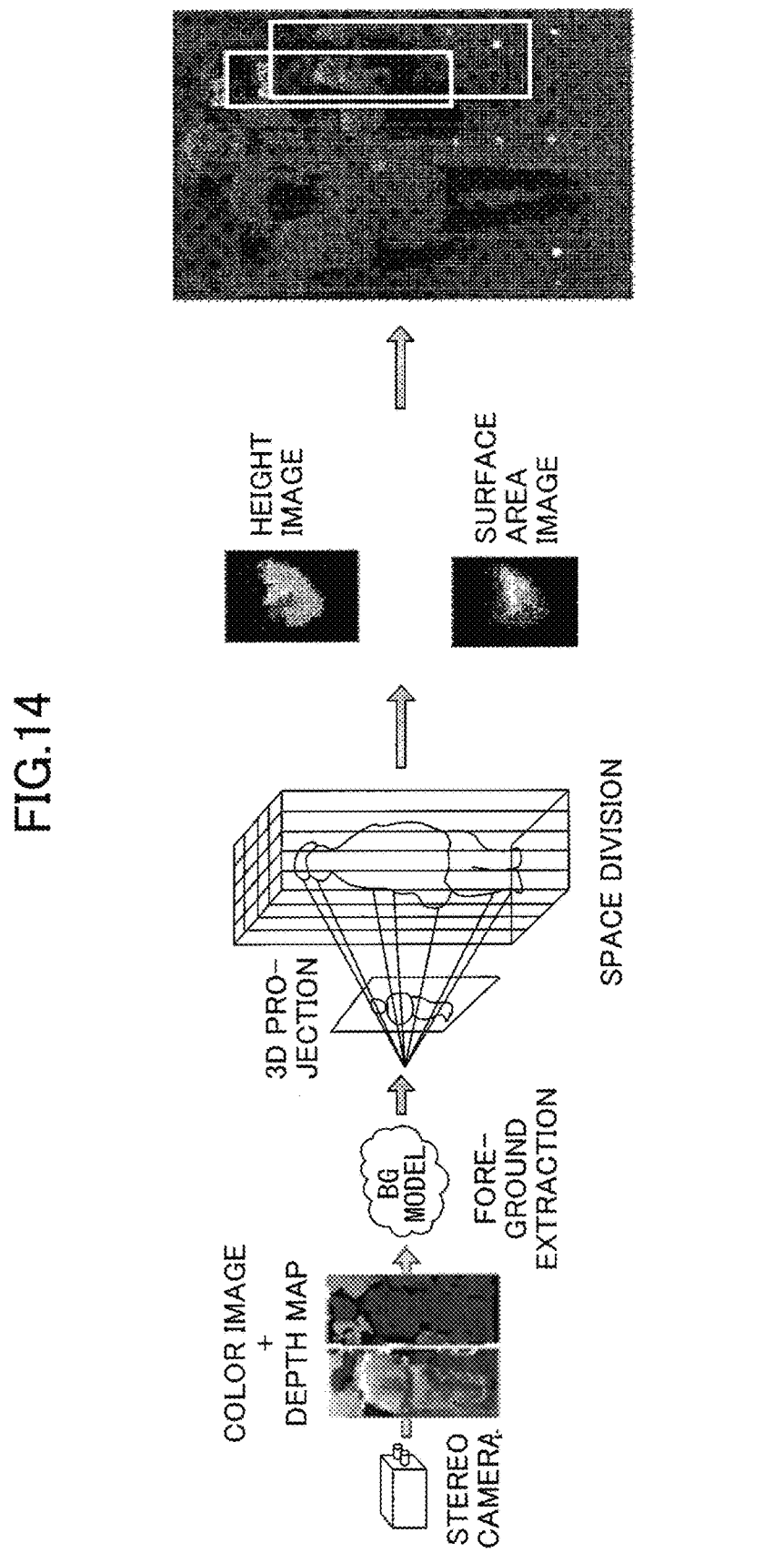
FIG. 14 illustrates an example of a process of generating a projection based height image and a projection based surface area image.

FIG. 14 illustrates an example of a process of generating the projection based height image and the projection based surface area image.

In particular, it is possible to extract, after a two-lens camera acquires right and left color images and a corresponding depth image, the foreground pixels by conducting background subtraction, and to convert the foreground pixels into the three-dimensional world coordinate system. And then, a predetermined space defined by the three-dimensional world coordinate system is divided into small cubes having a same bottom area along the direction perpendicular to the XOZ plane, each of the small cubes being called a "BIN" here. After that, on the basis of the BINs it is possible to generate two images, namely, one is generated by obtaining the heights of the highest points in each BIN (here, the larger a height is, the higher the brightness is, if reflected in an image), which serves as the projection based height image; and another is generated by acquiring the number of the points in each BIN (here, the more the number of the points is, the higher the brightness is, if reflected in an image), which serves as the projection based surface area image.

Here it should be noted that for more information about the above, it is also possible to refer to a paper whose title is "Plan-view Trajectory Estimation with Dense Stereo Background Model", whose author is T. Darrel, and which was published in 2001 and a paper whose title is "Stereo Person Tracking with Adaptive Plan-View Template of Height and Occupancy Statics", whose author is Michael Harville, and which was published in 2003, for example.

After that, in STEP S320 of FIG. 3, as for the extracted foreground pixels, it is possible to utilize the corresponding depth information to get their projection based height image and projection based surface area image, and then, based on the two images, to conduct clustering so as to acquire the foreground projection blocks after clustering.

Figure 15:
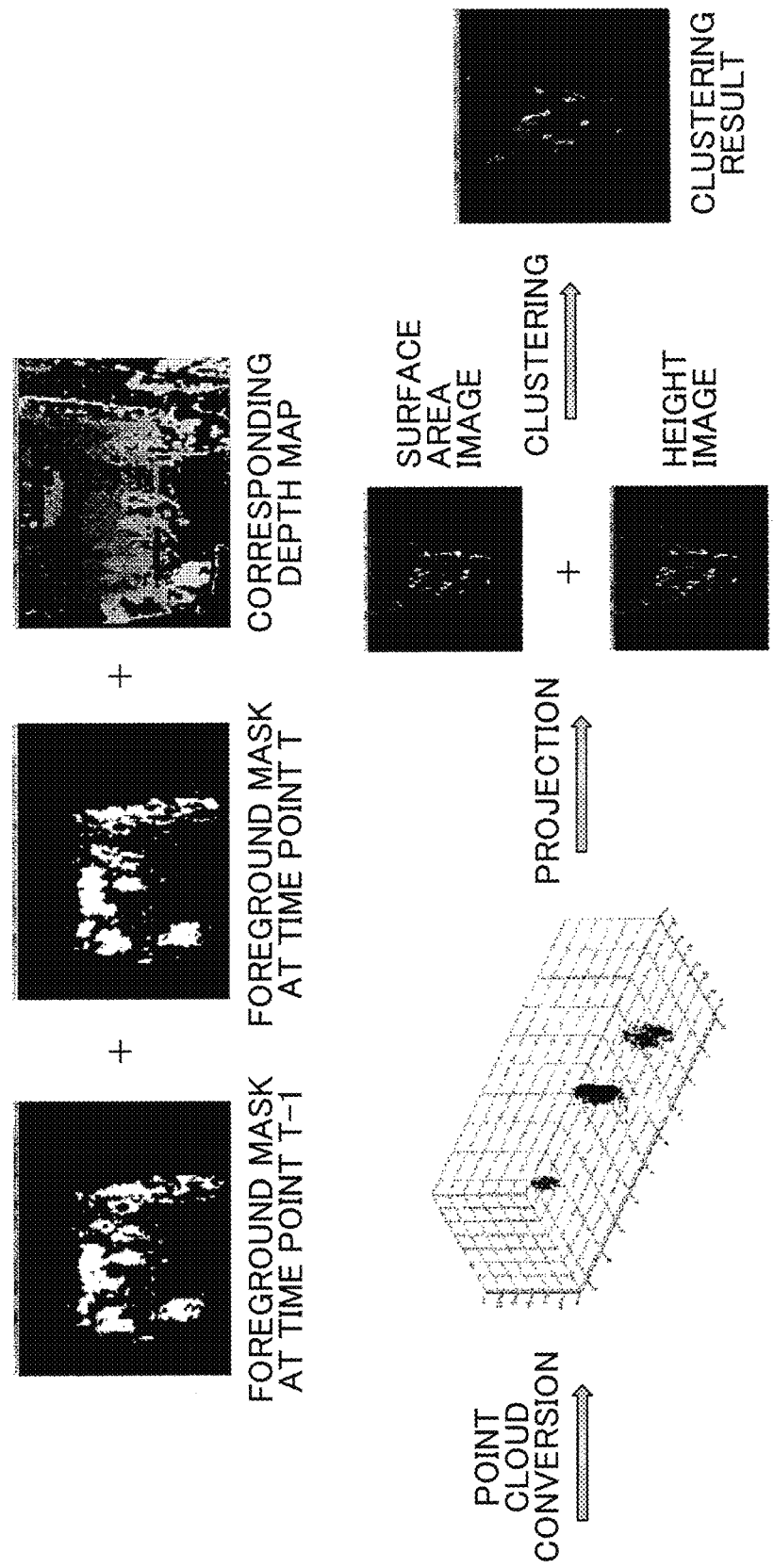
FIG. 15 illustrates an example of a clustering process based on a projection based height image and a projection based surface area image.

FIG. 15 illustrates an example of a clustering process based on the projection based height image and the projection based surface area image.

As shown in FIG. 15, first the foreground masks at the time point T-1 and T as well as the corresponding depth map are obtained. Next, the foreground masks are converted into the three-dimensional world coordinate system, and then, are projected onto the ground surface, so as to generate the projection based height image and the projection based surface area image. After that, on the grounds of these two images, it is possible to get a foreground projection block clustering result in the related top view.

Referring again to STEP 350 of FIG. 3; after obtaining the still foreground projection blocks, it is possible to determine, on the basis of the number of pixels in the still foreground projection blocks waiting for determination, whether there is a gathered crowd of people.

In an example, it is possible to count the number of pixels in each still foreground projection block waiting for determination, and then, to determine whether it is greater than or equal to a predetermined threshold. In the former case, it may be determined that there is a gathered crowd of people in the corresponding still projection block. Here, as for the predetermined threshold related to the number of pixels, it may be set by those skilled in the art based on the actual application circumstance, the degree of gathering to be detected, etc.

For example, if it is necessary to detect a crowd of people including more than ten persons, then it is possible to predetermine a threshold corresponding to ten persons, for example, one hundred pixels. In this case, if the number of pixels in a still foreground projection block waiting for determination is greater than or equal to one hundred, then it may be determined that there is a gathered crowd of people containing more than ten persons. Of course, this is just an example. Actually those skilled in the art may predetermine the threshold according to an empirical values, or may predetermine different thresholds in response to the different detection demands of the degree of gathering.

In another example, it is possible to estimate the number of persons in each still foreground projection block waiting for determination. For example, a regression model based approach may be utilized to estimate the number of persons in each still foreground projection block. In particular, it is possible to extract the relevant features of the corresponding still foreground projection block such as its area or perimeter to serve as the input of a pre-established regression model related to the number of persons and the extracted feature, so as to estimate the number of persons in the corresponding still foreground projection block. Of course, the present invention is not limited to the regression model based approach. Any other proper approach able to estimate the number of persons may be adopted here. For example, it is also possible to back-project the points in the corresponding still foreground projection block onto the relevant image so as to adopt a division based approach to estimate the number of persons in the corresponding still foreground projection block. If the estimated number of persons in the corresponding still foreground projection block exceeds a predetermined threshold (e.g., ten persons), then it may be determined that there is a gathered crowd of people therein.

Furthermore, in order to determine the degree of the gathering of people so as to conduct a further correspondence measure, it is also possible to set a few different risk thresholds, for example, a low risk threshold (e.g., ten persons), a middle risk threshold (e.g., fifty persons), and high risk threshold (e.g., one hundred persons). If the estimated number of persons is greater than the low risk threshold and less than the middle risk threshold, then a reminder may be given which indicates that there is a gathered crowd of people needing to be continuously monitored. If the estimated number of persons is greater than the middle risk threshold and is less than the high risk threshold, then it is possible to give an early warning indicating that there is a middle scale gathering of people. In this case, it is necessary to take necessary measures to avoid the further gathering of people. If the estimated number of persons is greater than the high risk threshold, then a warning may be given at once that means there is a large scale gathering of people. In this case, the gathered crowd of people needs to be evacuated immediately for the security purpose.

In this way, it is possible to not only determine whether there is a gathering of people in the target scene but also determine the degree of the gathering of people, so that it is possible to take necessary measures with respect to different degrees of the gathering of people.

Consequently, in STEP S350 of FIG. 5, it is possible to determine, on the basis of the obtained still foreground projection blocks, whether there is a gathered crowd of people, and then, to output the determination result.

Therefore, on the basis of the method of detecting the gathering of objects according to this embodiment, regarding a target scene image, by utilizing the depth information therein to project the foreground and the moving foreground therein on the ground surface so as to get a foreground projection image and a moving foreground projection image, then eroding the foreground projection image by the moving foreground projection image so as to acquire a still foreground projection image, and then, based on the still foreground projection image, determining whether these is the gathering of objects, it is possible to achieve more efficient and accurate real-time detection.

In what follows, a device for detecting the gathering of objects based on stereo vision according to an embodiment will be described in detail by referring to FIG. 16.

FIG. 16 illustrates a device 1600 for detecting the gathering of objects based on stereo vision according to this embodiment.

As shown in FIG. 16, the device 1600 may include an obtainment part 1610, a first projection part 1620, a second projection part 1630, an erosion part 1640, and a determination part 1650 configured to carry out STEPS 310 to S350 of the method shown in FIG. 3, respectively.

Here it should be noted that since STEPS 310 to S350 of the method shown in FIG. 3 have been depicted in detail above, the repeated explanations are omitted here.

The device 1600 may further include a clustering part (not shown in the drawings) configured to conduct a clustering process with respect to the neighboring ones among the still foreground projection blocks obtained by the erosion part 1640. Since the clustering process has been described in detail above, the repeated explanation is also omitted here.

Therefore, on the basis of the device 1600 of detecting the gathering of objects according to this embodiment, regarding a target scene image, by utilizing the depth information therein to project the foreground and the moving foreground therein on the ground surface so as to get a foreground projection image and a moving foreground projection image, then eroding the foreground projection image by the moving foreground projection image so as to acquire a still foreground projection image, and then, based on the still foreground projection image, determining whether these is the gathering of objects, it is possible to achieve more efficient and accurate real-time detection.

In addition, a system for conducting detection with respect to the gathering of objects based on stereo vision according to an embodiment of the present invention is provided as follows.

FIG. 17 illustrates a system 1700 for conducting detection with respect to the gathering of objects based on stereo vision according to this embodiment.

As shown in FIG. 17, the system 1700 may include at least an input device 1710, a processing device 1720, a storage device 1730, and an output device 1740.

The input device 1710 is configured to input the relevant images to be processed into the processing device 1720 from the outside. For example, the input device 1710 may utilize a conventional one.

The processing device 1720 is configured to execute the method of detecting the gathering of objects according to the embodiments of the present invention, or to serve as the device for detecting the gathering of objects according to the embodiments of the present invention. For instance, the processing device 1720 may include a conventional processor such as a CPU (Central Processing Unit).

The storage device 1730 is configured to store the relevant data necessary to the processing device 1720. The storage device 1730 may utilize a conventional one, for example.

The output device 1740 is configured to output the processing result of the processing device 1720. For example, the output device 1740 may utilize a conventional one.

Up to here, the method, device, and system for detecting the gathering of objects based on stereo vision according to the embodiments of the present invention have been illustrated in detail by referring to the relevant drawing.

However, it should be noted that the above respective embodiments are just exemplary ones, and the specific structure and operation of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201510244490.4 filed on May 14, 2015, the entire contents of which are hereby incorporated by reference.

What is claimed is:

1. A method of detecting a gathering of objects based on stereo vision, comprising:
    an obtainment step of obtaining a current image and a prior image of a target scene as well as corresponding depth information of the current image and the prior image;
    a first projection step of extracting foreground pixels corresponding to detection objects from the current image and the prior image, and then, projecting, based on the corresponding depth information, the foreground pixels corresponding to the detection objects onto a ground surface so as to acquire a foreground projection image including foreground projection blocks;
    a second projection step of conducting, based on image feature differences of the foreground pixels corresponding to the detection objects between the current and prior images, projection onto the ground surface to acquire moving foreground projection blocks indicating motion of the detection objects so as to get a moving foreground projection image;
    an erosion step of eroding the foreground projection blocks by utilizing the moving foreground projection blocks so as to obtain still foreground projection blocks; and
    a determination step of determining, based on the still foreground projection blocks, whether the gathering of objects exists.

2. The method according to claim 1, wherein, the second projection step includes
    conducting frame difference calculation with respect to image features between the current and prior images;
    converting a result of the frame difference calculation into point clouds in a three-dimensional world coordinate system by utilizing the corresponding depth information;
    projecting the point clouds onto the ground surface so as to generate a difference projection image; and
    carrying out a pixel based logical AND operation with respect to the difference projection image and the foreground projection image so as to generate the moving foreground projection blocks.

3. The method according to claim 1, wherein, the second projection step includes
    converting the foreground pixels corresponding to the detection objects extracted from the current and prior images into point clouds in a three-dimensional world coordinate system by utilizing the corresponding depth information, respectively;

equally dividing a predetermined space defined by the three-dimensional world coordinate system into plural cubes;

obtaining image feature histograms of point clouds therein corresponding to the current and prior images, and then, calculating a histogram based distance with respect to the current and prior images for each cube; and determining, based on the corresponding histogram based distance, whether there is motion therein between the current and prior images for each cube; and generating, based on cubes having motion, the moving foreground projection image.

4. The method according to claim 3, wherein, the second projection step further includes dividing each cube into plural sub cubes, wherein, the histogram based distance calculation for each cube includes regarding each sub cube in the corresponding cube, acquiring image feature histograms of point clouds therein corresponding to the current and prior images;

giving a weight value to each sub cube in the corresponding cube; and calculating, regarding each sub cube in the corresponding cube, a histogram based distance with respect to the current and prior images, and then, computing a weighted sum of the respective histogram based distances to serve as the histogram based distance related to the corresponding cube.

5. The method according to claim 1, further comprising:
a clustering step of conducting clustering with respect to neighboring ones among the still foreground projection blocks obtained in the erosion step, wherein, the determination step determines, based on the clustered still foreground projection blocks, whether the gathering of objects exists.

6. The method according to claim 1, further comprising:
a clustering step of conducting, before the erosion step, clustering with respect to the foreground projection blocks obtained in the first projection step, wherein, the erosion step utilizes the moving foreground projection blocks to erode the clustered foreground projection blocks so as to get the still foreground projection blocks.

7. The method according to claim 5, wherein, the determination step includes counting a number of pixels in each of the clustered foreground projection blocks so as to determine whether the gathering of objects exists.

8. The method according to claim 5, wherein, the determination step includes estimating a number of objects in each of the clustered foreground projection blocks so as to determine whether the gathering of objects exists.

9. The method according to claim 6, wherein, the clustering step includes obtaining, based on the corresponding depth information, a projection based height image and a projection based surface area image of the foreground pixels corresponding to the detection objects; and conducting, based on the projection based height image and the projection based surface area image, clustering so as to acquire the clustered foreground projection blocks.

10. A device for detecting a gathering of objects based on stereo vision, comprising:

an obtainment part configured to obtain a current image and a prior image of a target scene as well as a corresponding depth map;

a first projection part configured to extract foreground pixels corresponding to detection objects from the current and prior images, and then, projecting, based on corresponding depth information, the foreground pixels corresponding to the detection objects onto a ground surface so as to acquire a foreground projection image including foreground projection blocks;

a second projection part configured to conduct, based on image feature differences of the foreground pixels corresponding to the detection objects between the current and prior images, projection onto the ground surface so as to acquire moving foreground projection blocks indicating motion of the detection objects;

an erosion part configured to erode the foreground projection blocks by utilizing the moving foreground projection blocks so as to obtain still foreground projection blocks; and a determination part configured to determine, based on the still foreground projection blocks, whether the gathering of objects exists.

11. A non-transitory computer-readable medium having computer-executable instructions for execution by a processing system, wherein, the computer-executable instructions, when executed, cause the processing system to carry out the method according to claim 1.

* * * * *